June 23, 1970 J. R. WOODBURY 3,517,117

BANDWIDTH REDUCTION CODING TECHNIQUE

Filed Jan. 24, 1968 3 Sheets-Sheet 1

JAMES R. WOODBURY
INVENTOR.

BY Lindenberg & Freilich

ATTORNEYS

June 23, 1970 J. R. WOODBURY 3,517,117

BANDWIDTH REDUCTION CODING TECHNIQUE

Filed Jan. 24, 1968 2 Sheets-Sheet 2

JAMES R. WOODBURY
INVENTOR.

BY Lindenberg & Freilich

ATTORNEYS

United States Patent Office 3,517,117
Patented June 23, 1970

3,517,117
BANDWIDTH REDUCTION CODING TECHNIQUE

James R. Woodbury, Los Altos, Calif., assignor, by mesne assignments, to Southern Pacific Transportation Company, San Francisco, Calif., a corporation of Delaware Filed Jan. 24, 1968, Ser. No. 700,081
Int. Cl. H04n 7/12
U.S. Cl. 178—6 7 Claims

ABSTRACT OF THE DISCLOSURE

This invention provides a technique for enabling bandwidth reduction to be achieved in the transmission of facsimile signals, of the type obtained in scanning input copy. The analog signal derived by scanning at a transmitter is converted to an unclocked two level analog pulse train and then is converted into a three level analog pulse train wherein every alternate pulse signal is phase inverted. The three level analog pulse train is then transmitted over a communication channel to a receiver. The receiver includes equipment for restoring and utilizing the received signals.

BACKGROUND OF THE INVENTION

This invention relates to bandwidth reduction systems of a type suitable for use in facsimile transmission and more particularly to improvements wherein the bandwidth required for transmitting facsimile signals is reduced.

OBJECTS AND SUMMARY OF THE INVENTION

An object of this invention is to provide an improved and simplified system for reducing the bandwidth required for transmitting a train of non-synchronous two level signals.

Another object of this invention is the provision of a novel bandwidth reduction system for use in a facsimile transmitting system.

A bandwidth reduction on the order of about two to one in a facsimile transmission system, is achieved by processing a train of non-synchronous or unclocked, binary signals, such as those developed by applying the analog signal train output of a facsimile scanner to a threshold device. Each analog signal in the signal train, which exceeds the threshold of the threshold device, produces a pulse having a level which may be designated as +1, and which has the duration of the interval that the analog signal exceeds the threshold. The remainder of the analog signal train which does not exceed the threshold produces a level which may be designated as zero, and which has the duration of said remainder. These signals, which are in the form of a plus one or a zero signal, are then processed to produce a three level analog signal train which has every other one pulse inverted. The result is a three-level signal (plus one, zero, or minus one) which never undergoes a transition from plus one to minus one, or from minus one to plus one and in which the width of the binary signals from which the three level signals are derived is preserved. These signals can then be transmitted. The bandwidth required to send these signals is ideally one-half of the original bandwidth. By a non-synchronous or unclocked signal is meant that the duration or width of the signal is a variable and is determined by the extent of the printing on the scan copy from which the signal is derived.

DESCRIPTION OF THE INVENTION

Figures 1, 3:
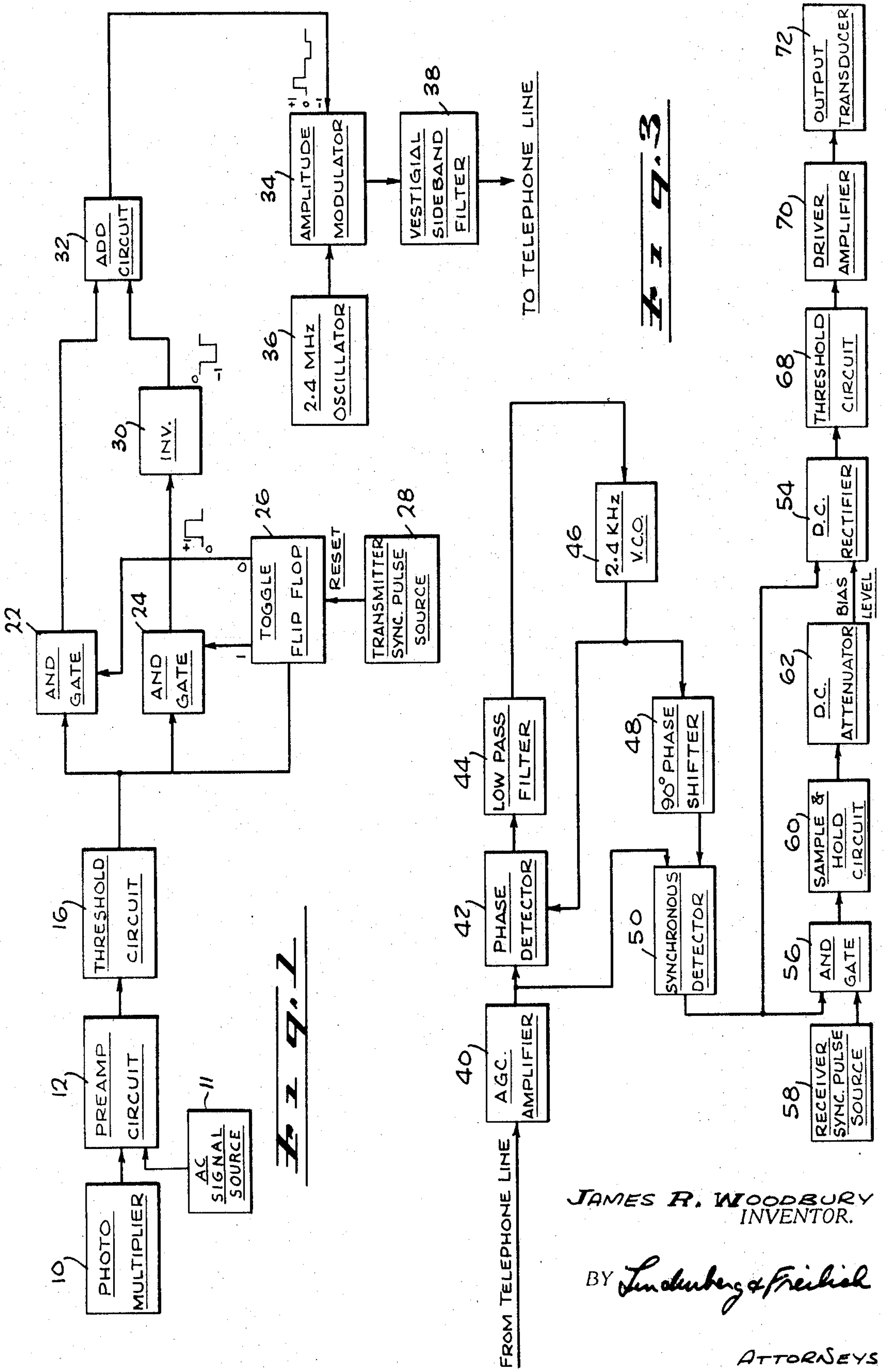
FIG. 1 is a block schematic diagram of a transmitter circuit in accordance with this invention.
FIG. 3 is a block schematic diagram of a receiver circuit in accordance with this invention.
Figure 2:
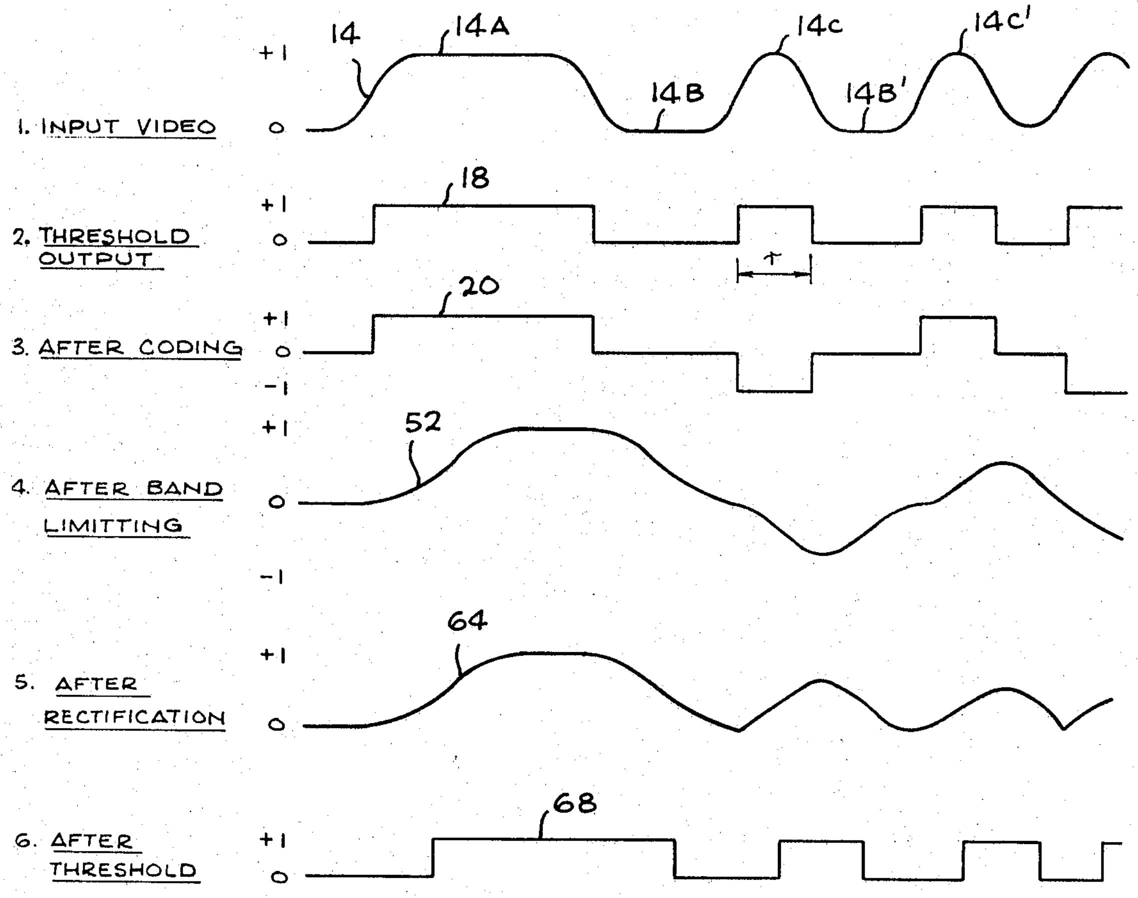
FIG. 2 is a diagram illustrating wave shapes of the type which are generated by a circuit functioning in accordance with this invention.

Referring now to FIG. 1, there may be seen a block schematic diagram of the invention which is suitable for use at a transmitter. By way of illustration the embodiment of the invention will be described for use within a facsimile system. That is, the signal which is to be transmitted employing techniques in accordance with this invention, is generated at a facsimile transmitter. A photomultiplier 10, which is employed as a scanning device at a facsimile transmitter, generates a sequence of analog signals, or an unclocked analog signal train, from the copy in the process of scanning, which is applied to a preamplifier circuit 12. The output of the preamplifier circuit 12 may comprise a wave train, such as the wave train 14 shown in FIG. 2. FIG. 2 represents wave shapes typical of those generated by the circuitry employed by this invention.

The wave train 14 is an unclocked analog signal wave train and represents the signal derived by way of example in scanning facsimile copy. Each scan line will have a beginning line pulse 14A, followed by a wave train in which black copy produces a one level which lasts as long as the black copy is present and white copy a zero level. Levels which last as long as the white copy is present in between one and zero are produced by gray copy. Here, the zero signals are designated as 14B, 14B', etc. The one signals are designated as 14C, 14C', etc.

The output of the preamplifier circuit 12 is applied to a threshold circuit 16. This well known circuit serves the well known function of squaring the input signal. The output of the threshold circuit is represented by the wave train 18 in FIG. 2. It will be seen here that the pulses of the wave train 14 have been squared so that the zeros and ones are more clearly defined. The duration of each one level pulse is determined by how long the analog signal from which it is derived exceeds the level of the threshold circuit. The remaining parts of the wavetrain 18 are at zero level and have the duration of the remaining parts of the analog signal which do not exceed the threshold level. Thus the wave train 18 is an unclocked two level analog wavetrain representing black and white information and the duration thereof.

In accordance with this invention, it is desired to convert the wave train 18 wherein the zeros and ones constitute the two level signals to a three level signal of the type represented by the wave train 20 in FIG. 2. There it may be seen that the phase of every other one signal is inverted. Expressed another way, each succeeding pulse signal has a phase opposite to that of the preceding pulse signal. The duration of each pulse in the three level wavetrain has the same duration as the two level pulse from which it is derived. Thus, the three level wavetrain is an unclocked analog wavetrain representing black and white information and the duration thereof.

The foregoing is achieved by applying the threshold circuit output to two AND gates respectively 22, 24, and to a toggle flip-flop 26. The toggle flip-flop is driven from its set to its re-set state or from its re-set to its set state in response to succeeding "one" pulse inputs. The flip-flop is forced to its re-set state, however, by the application to its re-set terminal of a pulse from the transmitter sync pulse source. Every facsimile transmitter has a sync pulse generator which usually provides a sync pulse at the beginning of a scanning line. This pulse is usually longer than the shortest pulse which is derived by scanning the copy. It will be appreciated that although the beginning line pulse is also present in the output of the threshold circuit, the flip-flop 26 is driven to the re-set state by the sync pulse derived from sync pulse source, regardless of what its state is at the time. The beginning line pulse is usually generated by having the photomultiplier scan over a black line at the beginning of each scanning line.

AND gate 24 is enabled each time the one output of the toggle flip-flop 26 goes high, to pass the signal received from the threshold circuit 16. AND gate 22 is enabled, each time the zero output of the toggle flip-flop goes high, to pass the one signal which is applied to its input from the threshold circuit. The toggle flip-flop, as previously indicated is driven from its set to its re-set state and vice versa by the succession of "one" pulse applied to its toggle input, in response to which, its one output goes high when it is in its set state, and its zero output goes high when it is in its re-set state.

The output of the AND gate 24 is applied to a phase inverter circuit 30, which functions to invert the polarity of the output received from AND gate 24 from a positive going pulse to a negative going pulse. The output of AND gate 22 and inverter 30 are applied to an adder circuit 32. This may be a resistive adder which combines its inputs so that a serial pulse train output results. This is the three level output wave form which is exemplified by the wave form 20 in FIG. 2. It will be seen that each succeeding one pulse shown in wave form 18 has its phase inverted with respect to the preceding one pulse.

A detailed explanation of the operation of the circuits following the threshold circuit 16 is as follows. Assume a scanning line having signals thereon of the type represented by the wave form 18. The beginning line pulse re-sets the flip-flop 26 whereby its zero output is high. This enables AND gate 22 to pass the beginning line pulse to the adder circuits. When the beginning line pulse drops to its zero level, zero level signal is received by the add circuit from the AND gate 22. Upon the occurrence of the next one pulse, flip-flop 26 is caused to toggle so that its one output is high. AND gate 24 accordingly can pass the one pulse to the inverter 30 which phase inverts it and applies it to the adder circuit 32. This explanation should suffice to enable one to see how the circuit arrangement provides a wave train such as 20 in response to an input wave train such as 18. As indicated previously, the bandwidth required to send this type of signal, coded as indicated, is ideally one-half of the original bandwidth.

By way of example, in a facsimile transmission system it was desired to use 100 lines per inch resolution with a line rate of 360 lines per minute or, 6 lines per second. Taking into consideration the time required for sending a synchronizing pulse, the line length available for transmitting data was considered as 9 inches.

To calculate one bit time, one determines the number of bits per line and the number of lines per second. One divided by the number of bits per line times the lines per second gives the bit time.

The bit rate for 100 lines per inch resolution was calculated therefrom as 5400 bits per second. Since the classical bandwidth requirement for transmission of 5400 bits per second is 2700 Hz. and since the useful band width on a communication channel such as a telephone line is 1400 Hz., bandwidth reduction techniques have to be employed. A system in accordance with invention was built for the exemplified facsimile system, and operated satisfactorily.

An amplitude modulator circuit 34 serves to modulate a 2.4 kHz. signal, which is received from the local oscillator 36. The output of the amplitude modulator is then applied to the vestigial side band filter 38, which is the usual input to the following communication channel.

A received circuit in accordance with this invention, is shown in block schematic diagram form in FIG. 3 It is assumed here that the receiver facsimile machine has been synchronized with the transmitter facsimile machine. The problem of maintaining synchronization has been solved and is not intended to be included here. The communication channel is connected to an AGC amplifier (automatic gain control) 40. The AGC amplifier serves the well known function of maintaining the white level of the incoming signal at a substantially constant amplitude, independent of transmission line loss variations. The maximum peak amplitude of the input is used as the AGC reference, since it always occurs at least once per line because of the black interval provided during the beginning line pulse. The phase detector, 42, low pass filter 44, and 2.4 kHz. voltage controlled oscillator 46, forms a phase locked loop which locks output, 90° out of phase with the carrier of the input signal. As indicated, the output of the AGC amplifier is applied to the phase detector which receives as its other required input, the output of the 2.4 kHz. VCO. The phase detector 42 feeds an error signal, representative of a difference in phase, through the low pass filter, which then applies it to the 2.4 kHz. VCO for the purpose of correcting the output frequency thereof, if required.

The output of the VCO 46 is applied to a 90° phase shifter 48, for the purpose of correcting the phase shift caused by the phase locked loop. The output of the 90° phase shifter is then applied to a synchronous detector circuit 50, which also receives as input the AGC amplifier output. The detector functions to demodulate the modulated carrier. The resulting wave form is represented by the wave form 52 in FIG. 2. This wave form shows the effects of bandwidth limiting.

The output of the synchronous detector is applied to a DC rectifier circuit 54, and also to an AND gate 56. AND gate 56 is enabled each time it receives a sync pulse from the receiver sync pulse source 58. The AND gate circuit 56 together with a sample and hold circuit 60 and a DC attenuator 62, serves the function of providing a reference or bias level for the DC rectifier 54, by detecting the peak amplitude of the black pulse which occurs during the sync interval. The sample and hold circuit samples the signal which it receives while the AND gate is enabled during the sync pulse. The signal which it receives has the amplitude of the beginning line pulse which has been transmitted. The sample and hold circuit then stores a level as determined by the amplitude of the beginning line pulse. The DC attenuator 62 which is merely a potentiometer, applies a portion of this level as a bias, to the DC rectifier 54.

The signal which is obtained after rectification, represented by the wave form 64 is shown in FIG. 2. It will be seen that all the phase inverted signals have been restored. After rectification, the output is applied to a threshold circuit 66. The output of the threshold circuit constitutes the wave form 68, which is shown in FIG. 2. This wave form is identical with the wave form 18, except that it has been shifted or delayed. The output of the threshold circuit 66 is applied to a driver amplifier 70, which drives the transducer 72 of the facsimile system.

Good readable copy may also be produced without using the threshold circuit.

If desired, the system described may be used for representing gray level signals derived from the copy. This may be done by mixing an AC signal from a source 11 with the output of the photomultiplier at the transmitter. The frequency of this AC signal is determined by the bandwidth of the communication channel. Since the amplitude of the analog signal produced by the photomultiplier in response to gray copy is less than in response to black copy, the effect of the added AC signal is to vary or modulate the gray signal amplitude at the AC signal frequency which when passed through the threshold circuit results in a rapidly occurring series of narrow "one" signals. These will appear as gray, when reproduced at the receiver. The amplitude of the AC signal should not be large enough to cause the pulse signal amplitude produced by scanning black to drop to where it will be converted to a zero signal by the threshold circuit, nor should it be so large as to raise a "white" representative signal to a "one" pulse.

There has accordingly been described herein a novel, useful and simple system for reducing the bandwidth required for transmitting video information in a facsimile system by converting the variable amplitude analog signal train generated by scanning copy into a two level unclocked analog pulse train and then converting the two level unclocked analog pulse train into a three level unclocked analog pulse train. This later analog pulse train is then transmitted.

What is claimed is:

1. In a facsimile system wherein copy is scanned to produce an analog signal train representative thereof, a system for reducing the bandwidth required for transmitting said analog signal train without clocking comprising:

means for converting said analog signal train to a two amplitude level analog pulse train wherein each analog signal in said analog signal train exceeding a predetermined amplitude is converted to an analog pulse having one amplitude level and the same time duration as the analog signal from which it is derived exceeds said predetermined amplitude and each analog signal in said analog signal train which does not exceed said predetermined level is converted to a pulse having a second amplitude level and the same duration as the analog signal from which it is derived, means to which said two amplitude level analog pulse train is applied for inverting the phase of alternate pulses having said one amplitude level to a phase opposite to that of the remaining pulses having said one amplitude level while retaining the same time duration as the pulse from which it is derived, to provide a three amplitude level analog pulse train, means for transmitting said three amplitude level analog pulse train, means for receiving said three amplitude level analog pulse train, means for converting said received pulse train to a two amplitude level analog pulse train, and means for utilizing said two amplitude level analog pulse train for reproducing the copy which was scanned.

2. A facsimile system as recited in claim 1 wherein said means to which said two amplitude level analog pulse train is applied for inverting the phase of alternate pulses having said one amplitude level to a phase opposite to that of the remaining pulses having said one amplitude level to provide a three amplitude level analog pulse train comprises:

a first disenabled gate means, a second disenabled gate means, phase inverter means connected to said second disenabled gate means output, means for applying said two level pulse train simultaneously to said first and second disenabled gate means inputs, means responsive to successive pulses in said two level pulse train for alternately enabling said first and second disenabled gate means, and means for combining the outputs of said first disenabled gate means and said phase inverter means to produce a three level analog pulse train having phase inverted alternate pulses.

3. A system as recited in claim 2 wherein said means responsive to successive pulses in said two level pulse train for alternately enabling said first and second disenabled gate means includes a flip-flop circuit means having first and second outputs connected to said respective first and second gate means inputs for alternately energizing said first and second gate means responsive to successive pulses.

4. In a facsimile system wherein copy is scanned for generating an analog signal train for each scanning line, said analog signal train having a first pulse representative of the beginning of a scanning line, an unclocked transmission system comprising:

means for converting said analog signal train to a two amplitude level analog pulse train wherein each analog signal exceeding a predetermined level is converted to an analog pulse having one amplitude level and a time duration determined by the time that the analog signal from which it is derived exceeds said predetermined level, and each analog signal in said analog signal train which does not exceed said predetermined level is converted to a pulse having a second amplitude level and the same duration as the analog signal from which it is derived, means for converting said two amplitude level analog pulse train to a three amplitude level analog pulse train including a first inoperative means to which said two amplitude level analog pulse train is applied for passing first and second amplitude level pulses, a second inoperative means to which said two amplitude level pulse train is applied for converting to a third amplitude level every pulse having said one amplitude level and for passing every pulse having said second amplitude level, means to which said two level amplitude pulse train is applied for alternately rendering operative said first and second inoperative means responsive to successive pulses having said one amplitude level, and means for combining the outputs of said first and second means to provide a three amplitude level analog pulse train, means for transmitting said three amplitude level unclocked analog pulse train, means for receiving said three amplitude level unclocked analog pulse train including:

rectifying means for converting said three amplitude level unclocked analog pulse train to a two amplitude level unclocked analog pulse train, means for biasing said rectifying means to a median level for each pulse train generated for each scanning line, including:

means for sampling the amplitude of each first pulse in a two level analog pulse train and means for applying a portion of said sample to said rectifying means, and means for utilizing the output of said rectifying means for reproducing the copy which was scanned.

5. In a facsimile system as recited in claim 4 wherein there is included a source of alternating current signals, and means for combining alternating current signals from said source with said analog signal train prior to its conversion to a two amplitude level signal pulse train by said means for converting said analog signal train.

6. A method of reducing the bandwidth required for transmitting an analog signal train derived from scanning copy in a facsimile system without clocking comprising:

converting said analog signal train to a two amplitude level unclocked analog pulse train wherein analog signals in said train exceeding a predetermined amplitude level are represented by pulses having one of said two amplitude levels and a pulse width determined by the interval during which the analog signals from which it is derived exceeds said predetermined amplitude level, and analog signals not exceeding said predetermined level are converted to pulses having a second amplitude level and a pulse width determined by the interval over which said analog signals from which they are derived do not exceed said predetermined level, inverting the phase of alternate pulses in said two amplitude level unclocked analog pulse train while preserving their pulse width to produce a three amplitude level unclocked analog pulse train, transmitting said three amplitude level analog pulse train, receiving said three amplitude level unclocked analog pulse train, and utilizing said received three amplitude level analog pulse train for reconstructing said scanned copy.

7. In a facsimile system wherein copy is scanned for generating an analog signal train representing each scanning line, a method of reducing the bandwidth required for transmitting said analog signal train without signal clocking comprising:

converting said analog signal train to a two amplitude level unclocked analog pulse train wherein analog signals exceeding a predetermined amplitude level are represented by pulses having one amplitude level and a pulse width determined by the interval over which the analog signal it represents exceeds said predetermined amplitude level and the analog signals not exceeding said predetermined level are represented by pulses having a second amplitude level and a pulse width determined by the interval over which said predetermined level is not exceeded, applying said two amplitude level unlocked analog pulse train to a first and second blocked path, successively alternately unblocking said first and second blocked paths responsive to successive one amplitude level pulses in said two amplitude level unclocked analog pulse train, phase inverting each one amplitude level pulse in said first blocked path, adding the outputs from said first and second blocked paths to produce a three level unclocked analog pulse train, transmitting said three level analog unclocked pulse train, receiving said transmitted three level unclocked analog pulse train, converting said three level analog unclocked pulse train back to said two amplitude level unclocked analog pulse train, and utilizing said two amplitude analog unclocked pulse train for reproducing said original copy.

References Cited

UNITED STATES PATENTS

| | | | |
|---|---|---|---|
| 3,459,892 | 8/1969 | Shagena et al. | 178—68 |
| 3,234,465 | 2/1966 | Lender | 178—68 |
| 3,233,236 | 2/1966 | Katzenstein et al. | 325—38 |

RICHARD MURRAY, Primary Examiner

B. LEIBOWITZ, Assistant Examiner

U.S. Cl. X.R.

178—68; 325—38